(12) United States Patent
Dove et al.

(10) Patent No.: US 7,030,737 B2
(45) Date of Patent: Apr. 18, 2006

(54) APPARATUS, SYSTEM, AND METHOD FOR INDICATING A LEVEL OF NETWORK ACTIVITY

(75) Inventors: Daniel Joseph Dove, Colfax, CA (US); Kenneth Boyd Neal, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 403 days.

(21) Appl. No.: 10/087,412

(22) Filed: Mar. 1, 2002

(65) Prior Publication Data

US 2003/0164771 A1    Sep. 4, 2003

(51) Int. Cl.
G08B 5/00    (2006.01)

(52) U.S. Cl. ............ 340/331; 340/286.02; 340/814.45; 709/223; 709/224; 710/18

(58) Field of Classification Search ............... 340/331, 340/286.01, 286.02, 815.4, 815.45; 709/224, 709/203, 250, 225, 220, 223, 248; 345/969, 345/39, 46, 82; 327/142, 20; 370/449, 254, 370/241, 246, 901, 401, 445, 463, 222, 252; 710/18; 713/100
See application file for complete search history.

(56) References Cited

U.S. PATENT DOCUMENTS

| | | | | |
|---|---|---|---|---|
| 5,487,666 A | * | 1/1996 | DiGiovanni | ................. 434/72 |
| 5,680,324 A | * | 10/1997 | Schweitzer, III et al. | ... 364/514 |
| 5,761,431 A | * | 6/1998 | Gross et al. | ........... 395/200.55 |
| 5,926,462 A | * | 7/1999 | Schenkel et al. | ........... 370/254 |
| 5,936,442 A | * | 8/1999 | Liu et al. | ..................... 327/142 |
| 6,061,742 A | * | 5/2000 | Stewart et al. | .............. 709/250 |
| 6,067,619 A | * | 5/2000 | Melvin et al. | .............. 713/100 |
| 6,256,318 B1 | * | 7/2001 | O'Callaghan et al. | ...... 370/447 |
| 6,339,584 B1 | * | 1/2002 | Gross et al. | ................ 370/225 |
| 6,446,119 B1 | * | 9/2002 | Olah et al. | .................. 709/224 |

* cited by examiner

Primary Examiner—Davetta W. Goins

(57) ABSTRACT

A controller generates a signal to control network activity-indicator devices based upon activity-level information provided by the central processing unit of a network component. This shifts the significant burden of controlling the indicator device from the central processing unit to the controller. The activity indicator-flashing pattern may change non-linearly relative to changes in the activity level to improve the quality of the information provided to network administrators. In addition, the flashing may also be randomized to provide a perception of actual network traffic patterns, and to reduce any appearance of correlated or synchronized flashing when multiple activity indicators are displayed.

24 Claims, 8 Drawing Sheets

APPARATUS, SYSTEM, AND METHOD FOR INDICATING A LEVEL OF NETWORK ACTIVITY

FIELD OF THE INVENTION

The present invention generally relates to electronic circuits, and more particularly to a circuit for indicating a level of network activity. In one embodiment, the circuit receives network activity information and provides a visual representation of network activity that is effective over a broad range of network activity levels.

BACKGROUND

As businesses rely on applications such as electronic mail and database management for core business operations, computer networking becomes increasingly more important. The most popular protocols used in networking are Ethernet and Fast Ethernet. A computer network is any collection of independent computers that communicate with one another over a shared network medium. Local area networks, or LANs, are networks usually confined to a geographic area, such as a single building or a college campus. LANs can be small, linking as few as two computers, but often link hundreds of computers used by thousands of people. LANs can include shared devices such as printers. The development of standard networking protocols and media has resulted in worldwide proliferation of LANs throughout business and educational organizations.

Often the network components are located in multiple physical places. Wide Area Networks, or WANs, combine multiple LANs that may be geographically separate. This is accomplished by connecting the different LANs using services such as dedicated leased phone lines, dial-up phone lines (both synchronous and asynchronous), satellite links, and data packet carrier services. Wide area networking can be as simple as a modem and a remote-access server for employees to dial into, or it can be as complex as hundreds of branch offices globally linked using special routing protocols and filters to minimize the expense of sending data over vast distances.

The network components are connected together by a network medium, such as cabling or a wireless channel. Network components such as hubs, bridges, transceivers, and routers make the network function, and include high-speed central processing units and switching devices to manage the network traffic. As more users are added, more data is moved over the network, and more network components are needed to manage the increased traffic.

The network administrators need to know the performance of the network, the level of traffic at which portions of the network are operating, and if any problems exist with network components and media. Typically, the performance, activity level, and existing problems are indicated using light emitting diodes (LEDs) that are associated with the network components. For example, the rate at which the LEDs flash may indicate the level of network activity.

FIG. 1 is a diagram of a conventional local area network system. Practically all LAN systems comprise a number of workstation computers 26 that are connected together to form a LAN 20. Other devices, such as printers and scanners, may be included in the LAN 20. The LAN 20 includes dedicated computers acting as a file server 21. The file server 21 provides access to attached storage devices, such as disk drives 28, which may contain shared data files. These data files are retrieved or updated by the file server 21 in accordance with requests transmitted by workstation computers 26 via the switch 24. The LAN 20 also allows the workstation computers 26 to connect to one another, and to be part of a wide area network (WAN).

The LAN 20 is essentially a shared-data transmission medium. As such, the capacity of the medium is shared between the workstation computers 26 attached to it. To provide higher performance of the LAN 20, network components, illustrated as LAN switch 24, are used. In the arrangement illustrated in FIG. 1, the LAN 20 is split into several independent segments 22A and 22B, which are interconnected with a LAN switch 24. The LAN switch 24 is programmed with, or automatically discovers, data regarding the connection arrangement of workstation computers 26 and corresponding segments. Because of this data, LAN switch 24 routes traffic only to relevant segments of the LAN, thus eliminating unnecessary traffic on other segments of the LAN 20. For large LANs, a substantial number of segments can be created to be interconnected by multiple LAN switches.

FIG. 2 is a block diagram of a conventional network component such as switch 24 of FIG. 1, and includes functional elements of the network component related to determining and displaying a network activity level. The network component 30 includes a central processor (CPU) sub-system 31; a switch application specific integrated circuit (switch ASIC) device 32 that includes within its boundary control & status registers, and counters 33, switching functions 35, medium access control sub-layer 36, and physical control sub-layer 37; a serializer/deserializer (SERDES) device 34 that includes within its boundary physical media access sub-layer 39, and physical medium dependent sub-layer 41; CPU interface 42, and activity-level indicator device 40 (sometimes referred to as a light emitting diode or LED, which is a type of an activity level indicator). Physical device boundary 38 also includes physical control sub-layer 37 (which is also part of switch ASIC 32), physical media access sub-layer 39, and physical medium dependent sub-layer 41. Network component 30 illustrates part of a particular LAN switch configuration that employs a switch ASIC. However, other configurations of network components exist which employ different functional partitioning.

CPU sub-system 31 is part of the processor controlling the network component 30, and generally includes a processor, RAM, ROM, and application programs stored in a memory. The network component 30 illustrated includes both a switch ASIC 32 and SERDES device 34, with the physical layer 38 including portions of both. An activity-level indicator device 40 is provided for each port being monitored, and typically is coupled to and driven from CPU sub-system 31. A network component with one hundred ports would typically have one hundred activity-level indicators, one assigned to each port.

Control & status registers, and counters 33 retain information related to the activity counts of the network component, including the transmission activity count and the reception activity count for each port. A method of driving an activity-level indicator 40 is to have CPU sub-system 31 read the control & status registers and control information 33 approximately every millisecond. CPU sub-system 31 then generates the control signal that turns the activity-level indicator device 40 on and off many times per second. The control signal generated in this manner often reflects activity counts for a port, and the activity-level indicator driven by the signal may become saturated and stays on continuously even though the port is not operating at its maximum level.

Another conventional method for determining and displaying network activity levels includes employing the switch ASIC 32 to convert each incident of network activity into a control signal that turns the activity-level indicator device 40 on and off. This method provides a one-to-one correlation between network activity and flashes. Because an incident of network activity happens faster than the eye can see, the control signal generated by the switch ASIC 32 stretches the incident so the flash of the activity-level indicator device 40 can be seen. As network activity level increases above a relatively low level, the one-to-one correlation of activity to flashes saturates the activity-level indicator device 40 and it stays on continuously. This gives a false impression that the network is very busy, and fails to adequately communicate network activity above a relatively low level.

There are other problems, however, with the present way of indicating the network activity level. The LEDs for a network component could be driven by the CPU in the network component, and there is usually a separate LED for each port. Traffic levels are sampled and computed by software operating in the CPU of the network component. The LED display for each port is driven directly by the CPU writing to a register to turn the LED on and off. This causes a problem because, to provide the network administrators with the information they need, the LED software runs at a high rate and consumes a large amount of CPU resources that are better served performing more critical functions in the network component. Another problem exists because traffic levels may not be effectively depicted by simply blinking a LED. Because of the high-speed networks presently being used, simply blinking a LED at a rate proportional to the traffic count may not adequately depict the traffic level to the administrator. For example, once the activity reaches a certain level, the LED may blink so fast that it appears to be solidly on.

Another problem exists because a network component may serve more than one hundred networked devices, such as computer workstations. Each computer may be connected to the network component at an individual port, each port having an LED activity indicator on the network component. When traffic counts are similar for multiple ports, the present method often presents multiple LEDs blinking in unison when the ports and the network media are functioning normally. However, multiple LEDs blinking in unison can be a sign of a problem with the network, and may cause administrators unfounded concern.

SUMMARY

In accordance with an embodiment of the invention, an activity-level indicator is provided that includes a controller operable to receive an activity level of a port from a processor associated with the port and to generate a signal that is related to the activity level, and that includes an indicator device coupled to the controller and operable to indicate the activity level in response to the signal. For example, there may be a predetermined number of activity levels, and the indicator device may be an LED that indicates the activity level by flashing at a corresponding rate. The controller relieves the network component CPU from the resource intensive task of generating the signal to operate the indicator device.

In accordance with another embodiment of the present invention, an activity-level indicator is provided that includes a controller operable to receive an activity level of a port from a processor associated with the port and to generate a signal that is related to the activity level, the signal comprising a series of separated pulses, the separation between pulses being a non-linear function of the activity level. The activity-level indicator also includes an indicator device coupled to the controller and operable to indicate the activity level in response to the signal. The pulses flash the activity level indicator. The separation time between pulses indicates the activity level of a port, the shorter the separation time, the greater the number of pulses and resulting indicator flashes per unit of time. The controller may increase the detail provided about a portion of the network activity spectrum by making the separation between the pulses a non-linear function of the activity levels. Instead of uniformly spacing the activity levels over the activity spectrum, the activity levels can be non-linearly or non-proportionally assigned, with a majority of the activity levels assigned to a minority portion of the activity spectrum. Assigning a majority of the activity levels to the lower count end of the activity spectrum will provide network administrators with more granularity in the slower speeds and less granularity in the higher speeds.

In accordance with yet another embodiment of the present invention, an activity-level indicator is provided that includes a controller operable to receive an activity level of a port from a processor associated with the port, and to generate a signal that is related to the activity level, the signal comprising a series of separated pulses, the length of a separation being randomized within a predetermined range for that activity level. The activity-level indicator also includes an indicator device coupled to the controller and operable to indicate the activity level in response to the signal. The controller may be further operable to generate a randomized number, and the separation becomes a function of the activity level and the randomized number generated for that separation. Randomizing the separation between pulses may reduce a perception of correlation between the flashing rates of LEDs on the same network component. Randomizing the separation between pulses also provides a perception of the randomization that is present in network traffic patterns.

BRIEF DESCRIPTION OF THE DRAWINGS

The embodiments of the invention are described with reference to the following description taken in conjunction with the accompanying drawings, in the several figures of which like referenced numerals identify like elements, and wherein.

DETAILED DESCRIPTION

Figure 1:
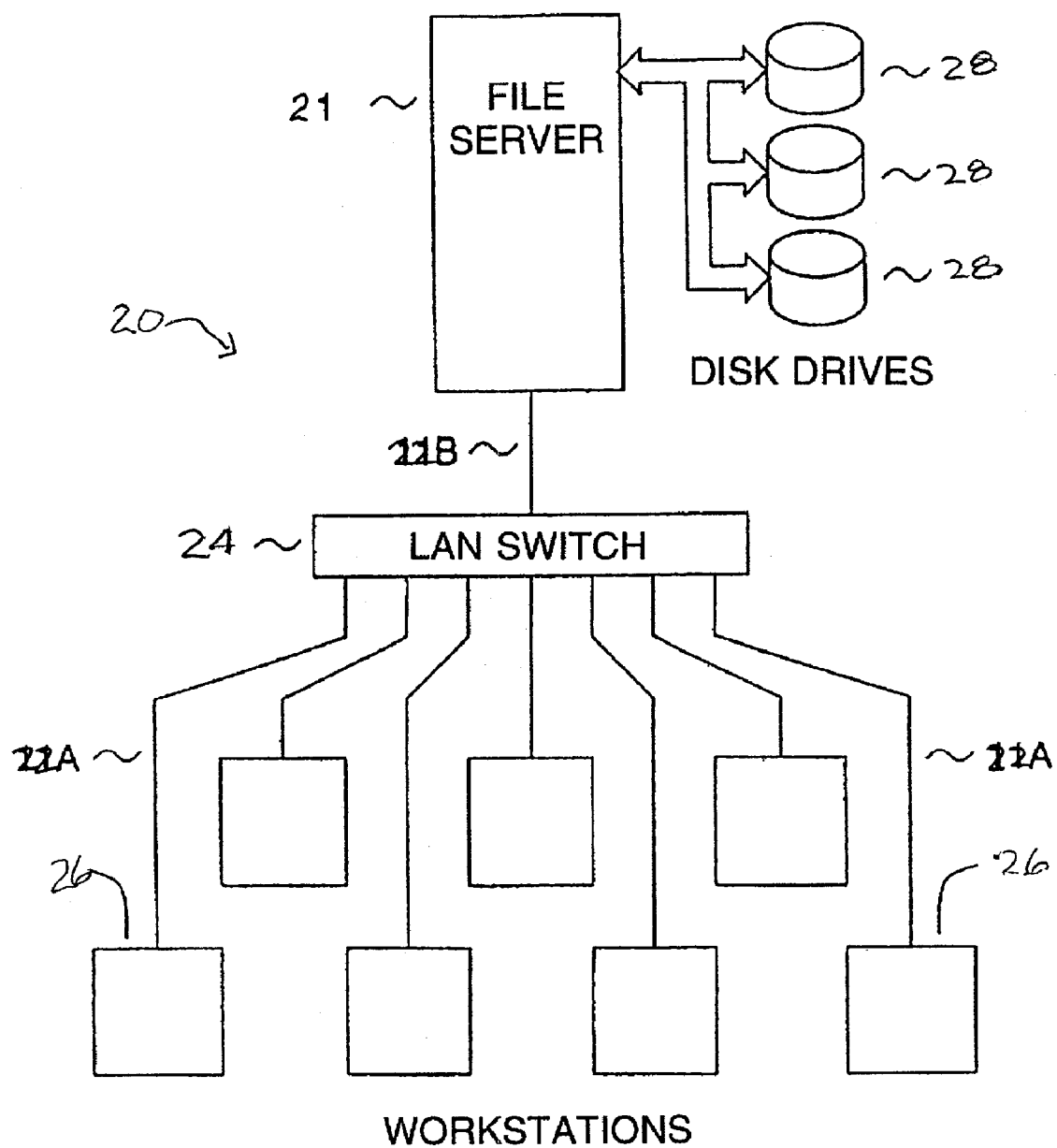
FIG. 1 is a diagram of a conventional local area network system.

In the following detailed description of exemplary embodiments of the invention, reference is made to the accompanying drawings that form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined by the appended claims.

Throughout the specification and claims, the following terms take the meanings explicitly associated herein unless the context clearly dictates otherwise. For example, the meaning of "a", "an", and "the" include plural references, and the meaning of "in" includes "in" and "on." Referring to the drawings, like numbers indicate like parts throughout the views. Additionally, a reference to the singular includes a reference to the plural unless otherwise stated or inconsistent with the disclosure herein.

Briefly stated, a controller generates a signal to control activity-indicator devices based upon activity-level information provided by the CPU of a network component. This shifts the significant burden of controlling the indicator device from the CPU to the controller. Furthermore, the changes in the activity-indicator flashing may be made non-linear relative to changes in the activity level to improve the quality of the information provided to network administrators. In addition, the flashing may also be randomized to provide a perception of actual network traffic patterns, and to reduce synchronized or correlated flashing when multiple activity indicators are displayed.

Figure 3:
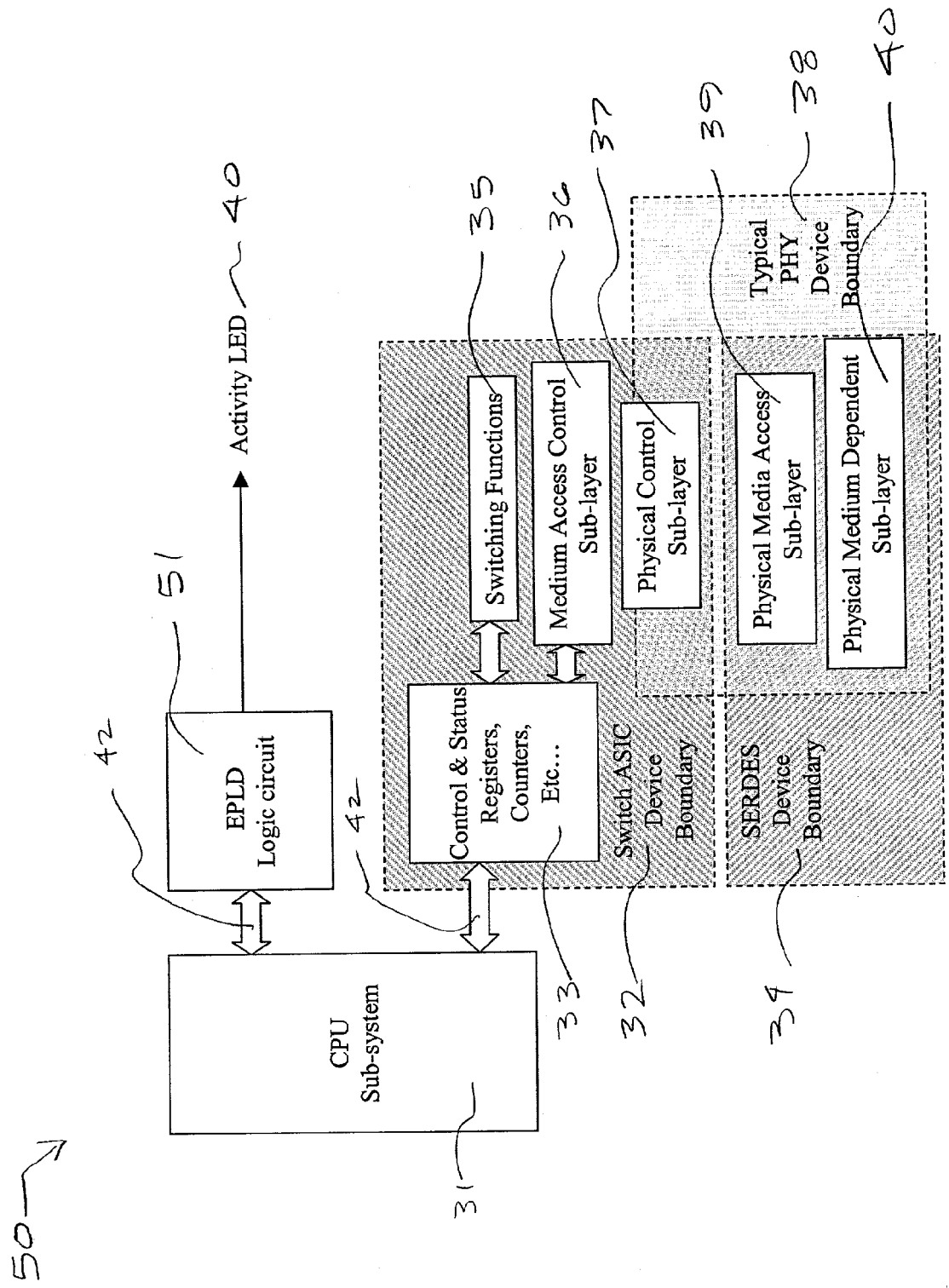
FIG. 3 illustrates relevant functional elements of a network component related to determining and displaying network activity level, in accordance with an embodiment of the present invention.

FIG. 3 illustrates relevant functional elements of a network component related to determining and displaying network activity level, in accordance with an embodiment of the present invention. Network component 50 includes a controller 51 operable to receive an activity level of a port and generate a signal that is related to the activity level. The controller 51 may be of any type, or of any combination of circuitry. It may include discrete components, may be an integrated circuit, or a programmable logic device. The controller 51 of the embodiment illustrated in FIG. 3 is an erasable, programmable logic device (EPLD). Controller 51 is coupled to activity-level indicator 40 and to the CPU sub-system 31. Controller 51 may be physically separate from or incorporated into other elements of network component 50. For example, in an alternative embodiment, controller 51 may be incorporated into switch ASIC 32.

In operation, CPU sub-system 31 is programmed to read the transmit and receive counts from control & status registers, and counters 33, for each port during an interval of time. While any interval of time may be used, the embodiment illustrated in FIG. 3 is programmed to read activity counts each second. CPU sub-system 31 is further programmed to determine an activity level relative to the link speed and to provide the determined activity level to the controller 51 for each port, preferably by storage in a register exposed to controller 51. The storage may be in control & status registers, and counters 33, or storage within controller 51.

Directly converting activity counts to indicator blinks may not adequately communicate activity for network components operating at multiple link speeds. An indicator configured to show a 50% 10BASE-T traffic activity count at a perceptible blinking rate would be solidly on at a 50% 1000BASE-T traffic activity count, and not provide adequate communication to network administrators. An aspect of the present invention computes a port activity level based upon the traffic count as a percentage of link speed. A 50% 10BASE-T traffic count will be computed to the same activity level as a 50% 1000BASE-T traffic count. This allows the relative activity level to be communicated by the same indicator device. For the purposes of this specification, including the claims and description, "activity level" refers to a value based upon the targeted activity count as a percentage of possible targeted activity counts. "Activity level" can refer to any activity occurring in any apparatus that is to be indicated. The embodiments described herein create a signal based upon the transmission and reception activities in an Ethernet-based LAN. In alternative embodiments of the invention, other network activity may be indicated, such as collisions.

Controller 51 acquires the determined activity level for each port, and generates a signal related to the determined activity level, which is used to drive activity-level indicator device 40 for the port. Activity-level indicator device 40 may be a light emitting diode (LED), a liquid crystal display, or any other device operable to indicate an activity level. Activity-level indicator device 40 may be a device that changes colors in response to a signal.

In this embodiment of the present invention, controller 51 generates the signal to control activity-level indicator device 40 instead of CPU sub-system 31 as is the conventional practice. Instead of being required to read activity counts about every millisecond and generate a signal, the CPU sub-system 31 is only required to generate an activity level value once a second. This reduces the CPU workload by about a factor of approximately one thousand, which becomes significant as the number of ports served by a network component increases.

Figure 4:
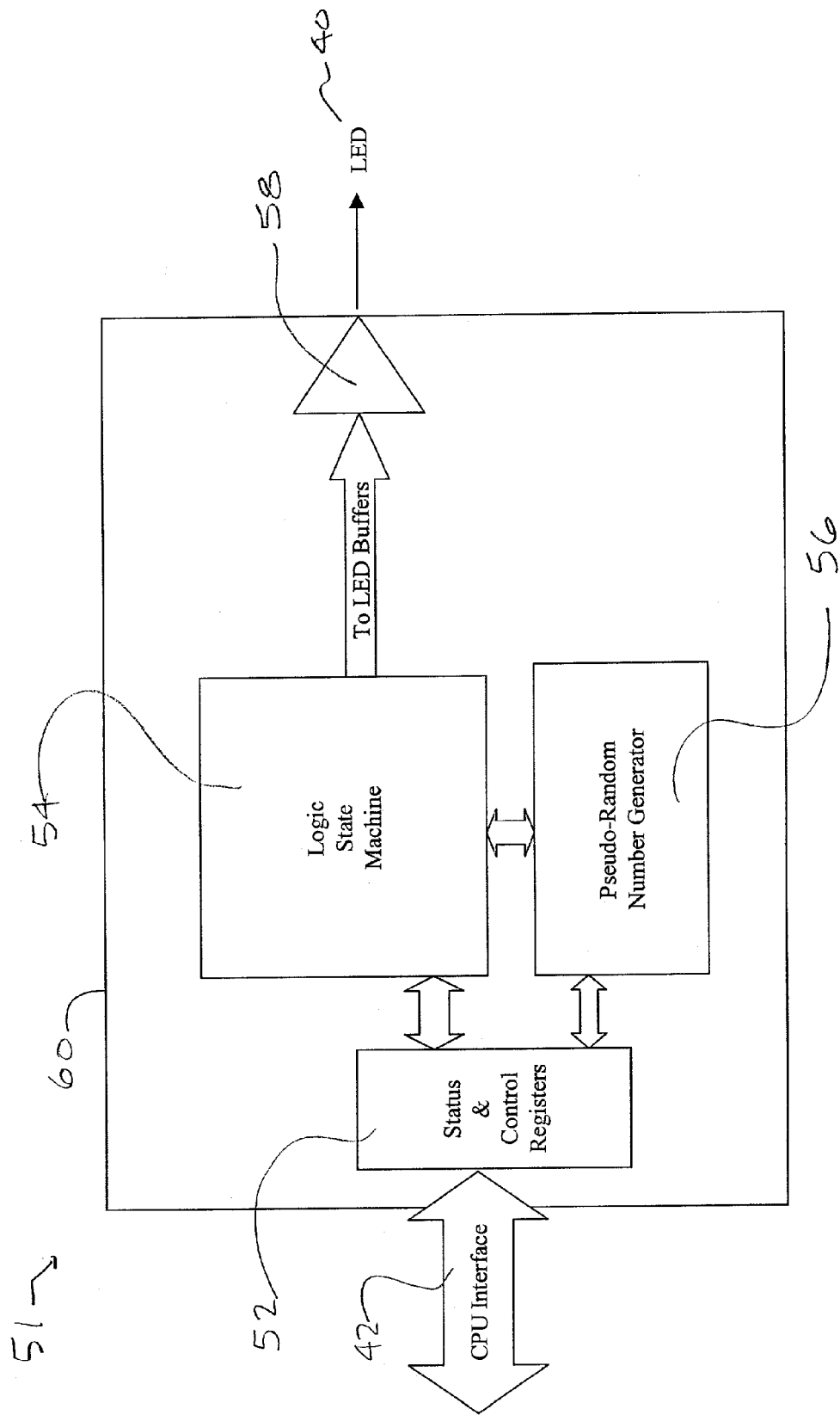
FIG. 4 illustrates relevant functional elements of a controller operable to receive an activity level of a port and generate a signal that is related to the activity level, in accordance with an embodiment of the present invention.

FIG. 4 illustrates relevant functional elements of a controller operable to receive an activity level of a port and generate a signal that is related to the activity level, in accordance with an embodiment of the present invention. The controller 51 is illustrated as a hardware state machine embodied in an EPLD logic circuit 60, and includes status & control registers 52, logic state machine 54, pseudo-random number generator 56, and LED buffers 58. A Verilog code for an embodiment of the hardware state machine embodied in the EPLD logic circuit 60 is attached hereto as an appendix. Additional description of the pseudo-random number generator 56 is provided in conjunction with FIG. 8.

EPLD 60 is coupled to the CPU sub-system by CPU interface 42. Status & control registers 52 are operable to receive the activity levels written by the CPU sub-system, and are exposed to logic state machine 54 and pseudo-random number generator 56. Buffer 58 is coupled between activity indicator 40 and logic state machine 54. Pseudo-random number generator 56 is coupled to logic state machine 54 and status & control registers 52.

In operation, Logic state machine 54 reads a port activity level for an interval of time stored into the status & control registers 52 by the CPU sub-system. Logic state machine 54 generates a signal that is related to the activity level of the port. The signal comprises a series of separate pulses, the separation between pulses being a function of the activity level. The pulse portion of the signal turns the activity-level indicator 40 on for a set amount of time (10 milliseconds in a preferred embodiment) and then off during the separation. The signal is sent to LED buffer 58, which drives the activity level indicator, shown as the LED 40. If the CPU stores an activity level for a high rate into the status & control registers 52, the signal provided by the EPLD 60 will have a short separation between pulses. This drives the LED 40 to be off for a short time and provides a perception of faster blinking and high activity. If the CPU stores a low activity level, the signal provided by logic state machine 54 will have a long separation between pulses. This drives the LED 40 to be off for a longer time, and provides a perception of slower blinking and less activity. At the maximum activity level, the logic state machine 54 generates a signal with no separation between pulses to turn the LED 40 on continuously to represent very high traffic levels. At the minimum activity level, the logic state machine 54 generates a signal with no pulses, thus leaving the LED 40 off representing no activity.

In another alternative embodiment, the separation between pulses is randomly varied to reduce the likelihood that multiple, flashing LEDs on a network component will appear to blink in synchronization or otherwise appear to be correlated. In this alternative embodiment, pseudo-random number generator 56 provides sufficient randomization to reduce a possible perception of correlation or synchronization. Pseudo-random number generator 56 generates a pseudo-random number used by logic state machine 54 to provide a degree of randomization in the separation between pulses to simulate the inherent randomness of network activity. Logic state machine 54 generates a signal where the separation between pulses is a function of both the activity level and a number generated by pseudo-random number generator 56. The variation in separation for an activity level is limited within a predetermined range for that activity level. The signal will turn on the LED 40 for a set amount of time (10 ms in a preferred embodiment) and then off for a period of time to provide the separation, which has a randomized element.

Since the EPLD 60 is generating the signal driving the blinking of the indicator device, the CPU of the network component will only need to update the activity level for each port once every second in a preferred embodiment. The EPLD 60 performs the task of providing the signal to drive the LED 40. The pseudo-random element is also provided so that multiple ports on a switch can have the same activity level without appearing to be in synchronization or correlated, because synchronization or correlation can sometimes indicate a faulty network condition.

Figure 2:
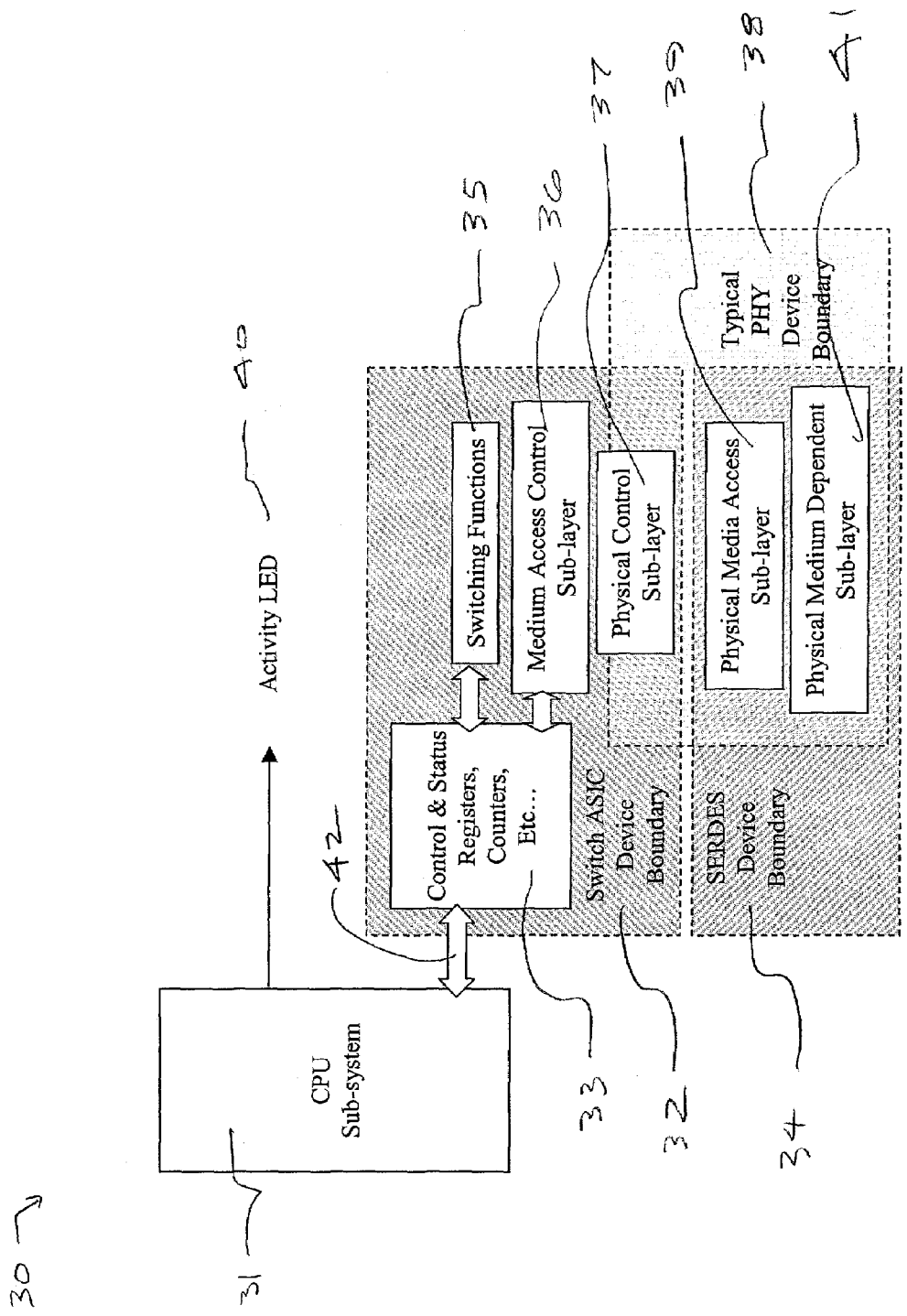
FIG. 2 is a block diagram of a conventional network component, and includes functional elements of the network component related to determining and displaying a network activity level.
Figure 5:
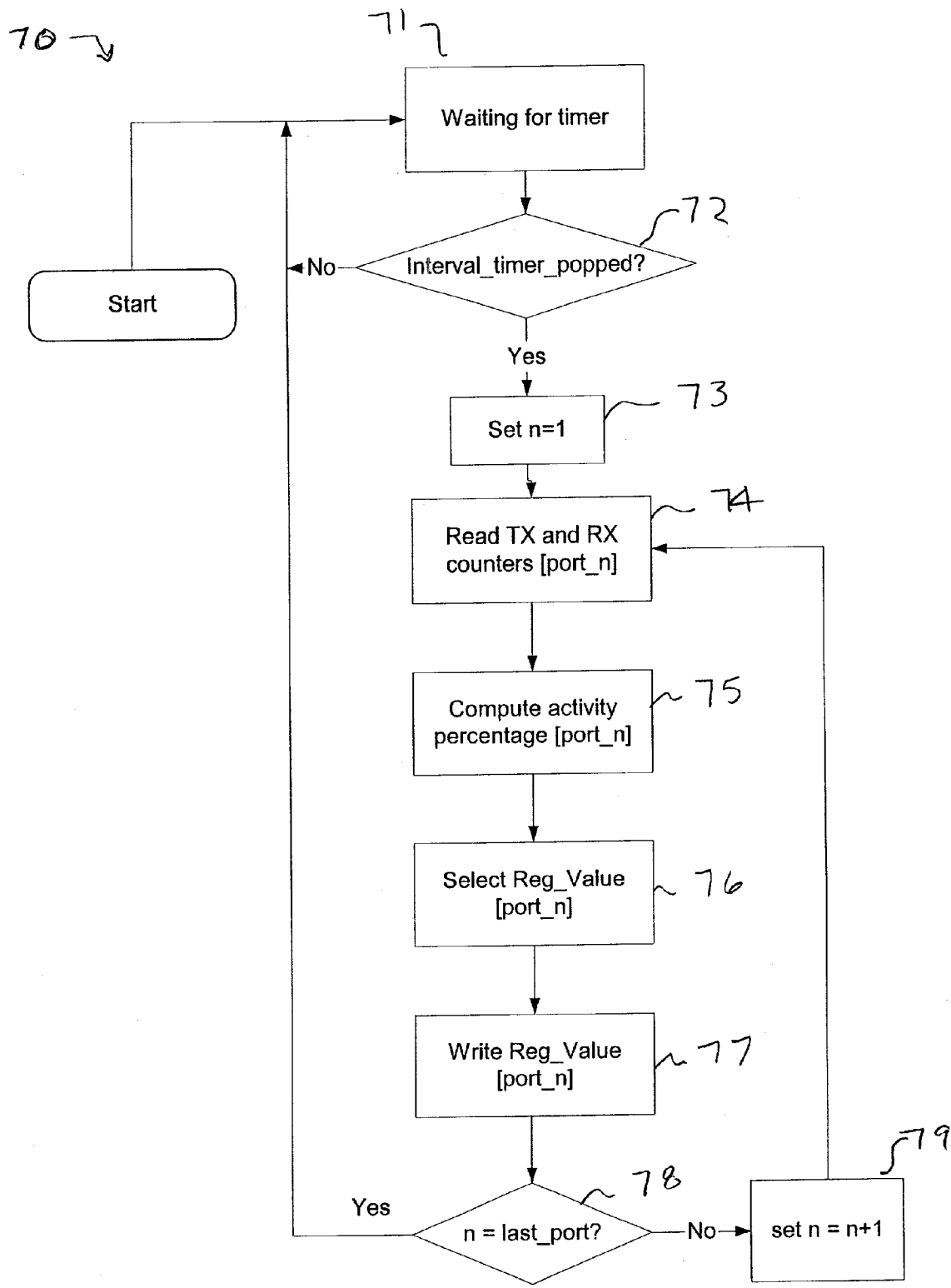
FIG. 5 is a flow chart illustrating a process to determine a port activity level value for each port in a network component during a time interval and to write the activity level value to a register, in accordance with an embodiment of the present invention.

FIG. 5 is a flow chart illustrating a process to determine a port activity level value for each port in a network component during a time interval and to write the activity level value to a register, in accordance with an embodiment of the present invention. Process 70 determines the port activity level value for each port in a network component during a time interval. Process 70 is typically performed by a CPU associated with the ports in the network component, such as CPU sub-system 31 of FIG. 3. In an alternative embodiment, process 70 may be performed by another processor exposed to the network counters. The port activity level values may be written to storage exposed to controller 51 of FIG. 4, such as the control & status registers and control information 33 of FIG. 2, or the status & control registers 52 of FIG. 4.

Moving from a start block, the process 70 advances to process block 71, at which point it waits for an interval timer, which may be driven as an interrupt or polled element. In an embodiment, the interval timer is set for one second, but may be longer or shorter within usability limits set by the system parameters. Process block 72 queries whether the interval timer has popped. When the interval timer pops, the process advances to block 73 where the counter for the port number is initialized by setting n=1. The process moves to block 74 where the transmit (TX) and receive (RX) activity counters for the port are read and summed. Transitioning to block 75, the sum of the activity counter is computed as a percentage of the link speed. The sums should be weighted so that equal percentages of events at different link speeds will cause identical LED behavior. For example, 50% 10BASE-T traffic should result in the same activity level value, and cause the same amount of LED flicker and brightness as 50% 100BASE-T or 1000BASE-T traffic.

Next, the activity level value is determined at process block 76. The activity levels, illustrated as Reg_Value in block 76, may include any number of increments depending on the granularity desired. In an embodiment, five activity level values (Reg_Value) are equated to 0%, 25%, 50%, 75% or 100% of maximum link speed activity (0,1,2,3 or ON). This uniform percentage spacing of the activity levels may provide a linear representation of activity levels. These values are coded with three bits where the ON bit determines if the LED was on all of the time, or blinked depending on the value of the other two bits.

However, a linear representation may not be desirable. An object of the invention is to present port and network activity in a manner representative of the activity occurring and in a meaningful format to network administrators, but not necessarily in a direct relationship to the activity. An additional object of the invention is to employ the physiological responses of the human eye to an indicator device, such as a flashing light emitting diode (LED). FIG. 5 illustrates an alternative embodiment meeting these objectives by providing for a non-linear conversion of the activity counts into discrete activity levels that is weighted toward lower percentages of activity. In this embodiment, the activity levels are not uniformly spaced over the activity percentage. This over represents activity at slower speeds and under represents activity at higher speeds, thus providing a non-linear relationship between activity counts and activity levels. In this alternative embodiment, five Reg_Value values were used that equated to 0%, 10%, 30%, 60%, and 100% of maximum link speed activity. This prevents high percentage levels of normal network traffic from causing the LED's to be on continuously and lead the user to believe the network is overly congested. The alternative embodiments are implemented by the particular algorithm employed to select Reg_Value at block 76.

Moving to block 77, the selected Reg_Value for a port is written to storage. Next, at block 78, a determination is made whether all port activity levels have been determined by the process. If not all ports have been determined, the process moves to block 79 to increment "n", and then returns to block 74 to generate and store activity levels for the next port. When the last port has been determined, the process moves back to block 71. The process continues until the network component is turned off.

Figure 6:
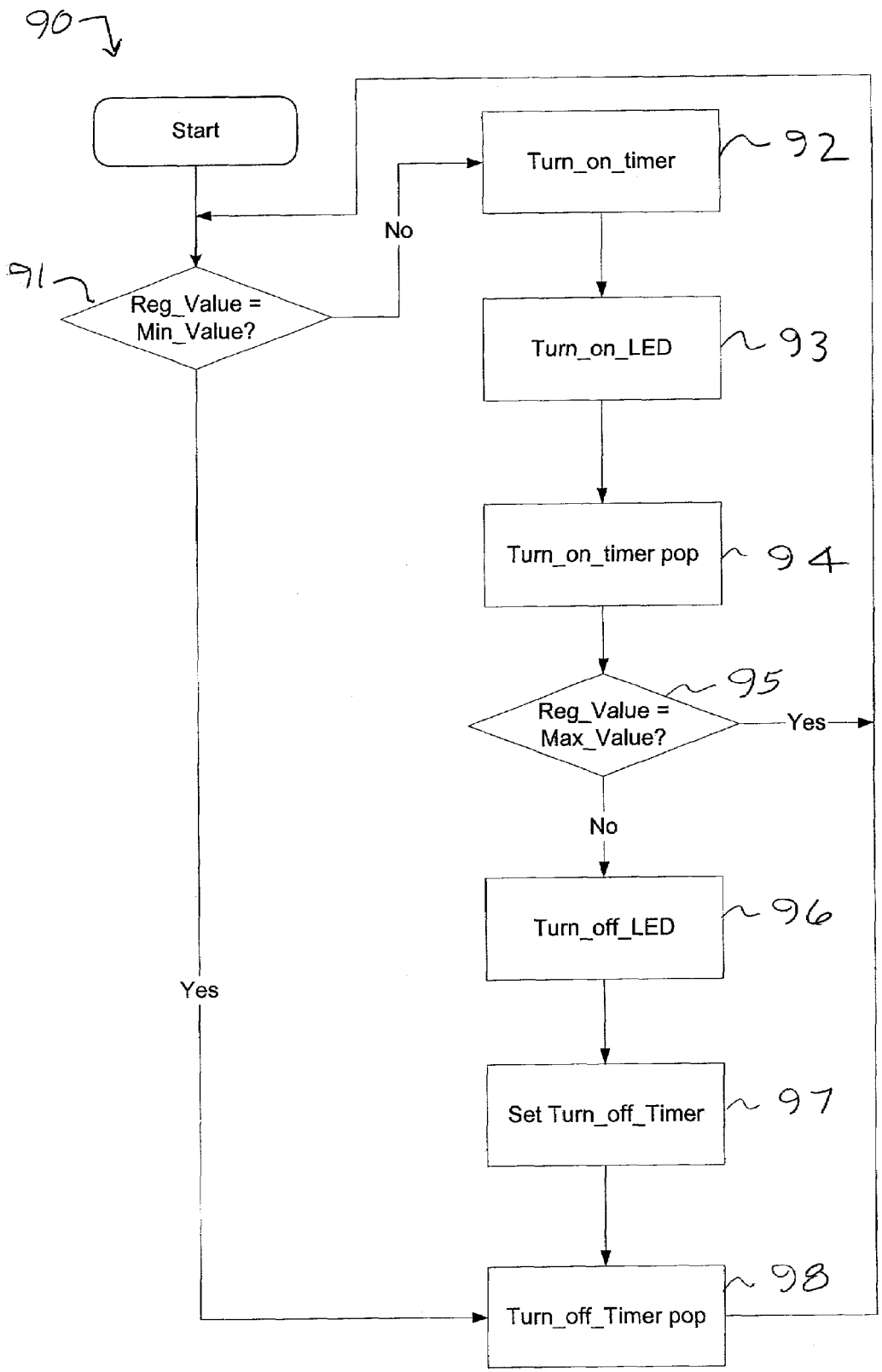
FIG. 6 is a flow chart illustrating a process to generate a signal that is related to the activity level of a port in a network component during a time interval, in accordance with an embodiment of the present invention.
Figure 7:
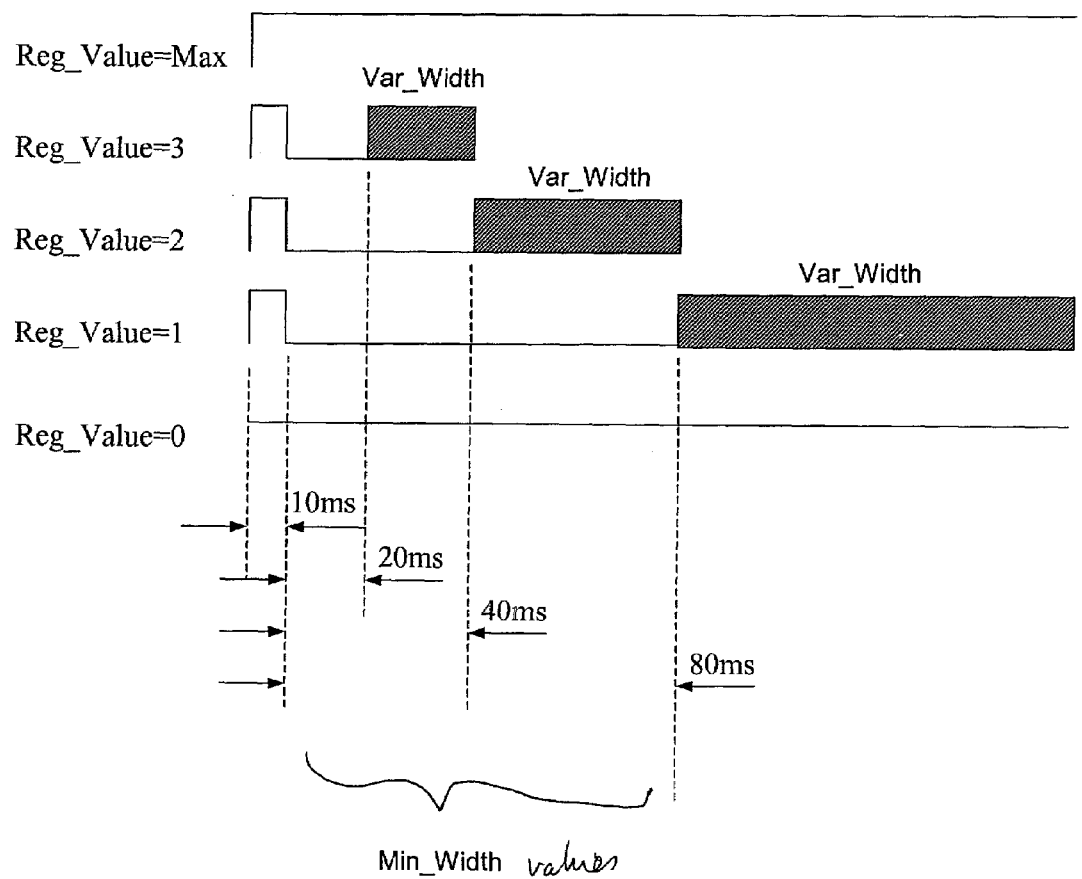
FIG. 7 is a timing diagram illustrating the randomized pulse separation minimum width and variable width portions of the separation between pulses of the signal provided by the "set Turn_off_timer" block of FIG. 6, in accordance with an embodiment of the present invention.

FIG. 6 is a flow chart illustrating a process to generate a signal that is related to the activity level of a port in a network component during a time interval, in accordance with an embodiment of the present invention. FIG. 7 is a timing diagram illustrating the minimum width and variable width portions of the separation between pulses of a signal, in accordance with the present invention. FIG. 7 illustrates the process at block 97 of FIG. 6 to "set Turn_off_timer," and will be described in more detail in conjunction with block 97.

Process 90 is typically performed by the controller 51 of FIG. 4 The process is repeated for each port of a network component. The preferred embodiment illustrated in FIG. 6 employs a one-second activity count time interval, five activity levels [0, 1, 2, 3, and ON], and a 10 millisecond pulse.

Moving from a start block, the process advances to block 91 where a determination is made whether the activity level (Reg_Value) stored in the status & control register for the port equals the minimum value, which is zero in this embodiment. When Reg_Value=Min_Value=0, the process moves to block 98 to turn off any timer that may have been set, and the process then moves back to block 91. This results in no pulse portion of a signal being generated to turn on the indicator device, and the indicator is not turned on. FIG. 7 illustrates no pulse when Reg_Value=0, and extends the separation to the one second sampling period of the preferred embodiment. When a determination is made at block 91 that Reg_Value does not equal the Min_Value, the process moves to block 92 to start Turn_on_timer, and a signal pulse is started to turn on the activity indicator. The Turn_on_timer is set for a preselected interval of time, which in a preferred embodiment is 10 milliseconds.

The process moves to block 93 where the activity indicator for the port is turned on by the pulse. Moving to block 94, the Turn_on_timer pops at the end of the preselected interval of time. The 10-millisecond interval of time in a preferred embodiment was selected based upon the responsiveness of the human eye. The eye can observe a 10-millisecond pulse and will retain this information for at least 20 milliseconds. Next, the process moves to block 95, where the determination is made whether the activity level equals the maximum value (Reg_Value=Max_Value=4). When Reg_Value=Max_Value, the process moves back to block 91. This results in the signal pulse continuing and the LED remaining on until a new Reg_Value is received in the next time interval. FIG. 7 illustrates this state for Reg_Value=Max. Otherwise, the process moved to block 96, where the signal pulse is turned off and the LED turns off.

Moving to block 97, the set Turn_off_timer establishes the separation between pulses, i.e., the duration of the off-time. If the separation between pulses, or off time, is greater than about 20 milliseconds, the LED will appear to flash. The longer the off-time, the slower the flash will appear to be. The separation between pulses may be a function of several factors. In an embodiment, each activity level (except zero and ON) has a fixed, pulse separation time associated with it. The separation between pulses may decrease non-linearly as the activity level increases. For example, activity level 1, (Reg_Value=1), could have a separation between pulses of 220 milliseconds, activity level 2, (Reg_Value=2), could have a separation between pulses of 75 milliseconds, and activity level 3, (Reg_Value=3), could have a separation between pulses of 30 milliseconds. This separation will provide a user with distinctly different flash rates for the different activity levels.

Figure 8:
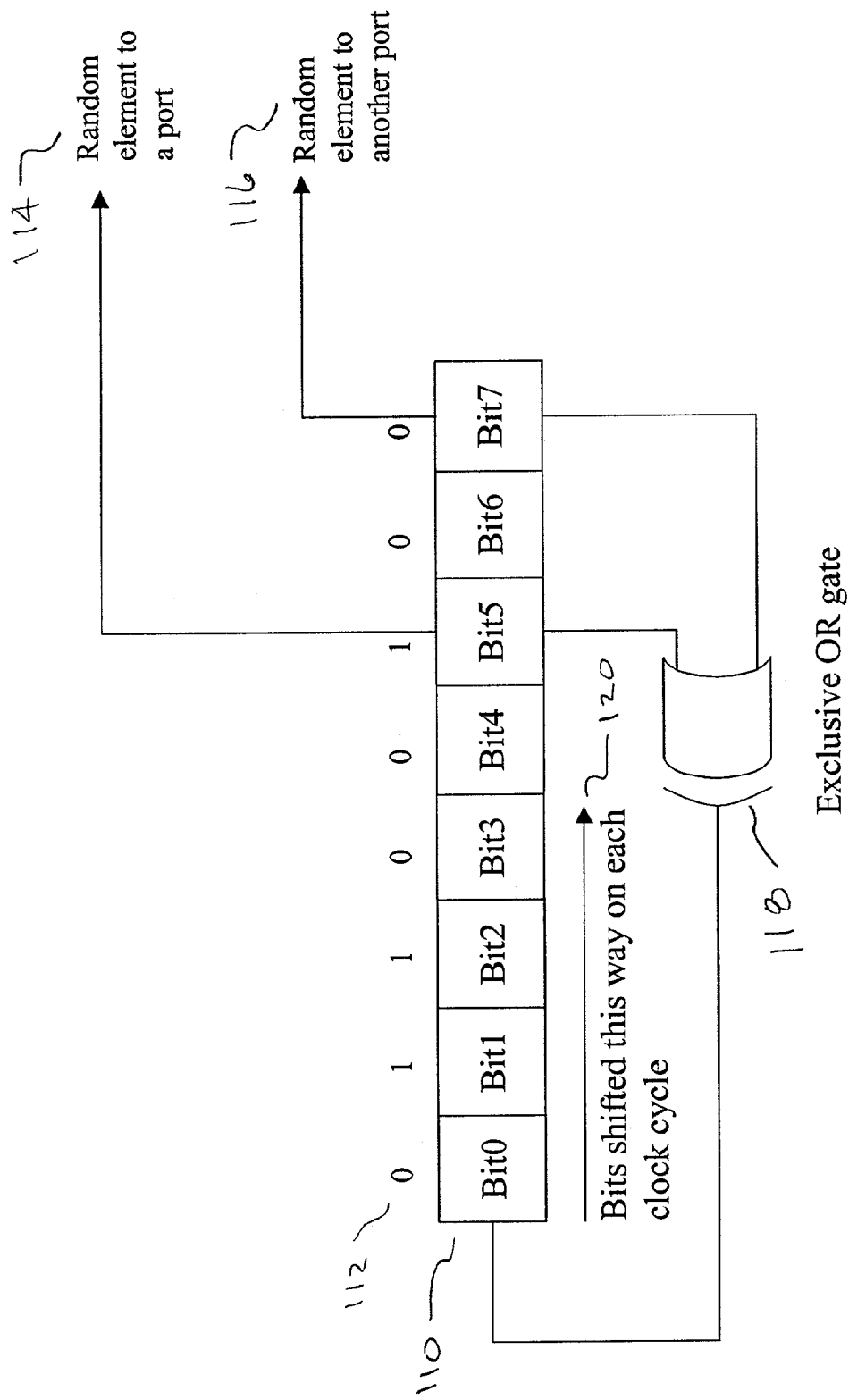
FIG. 8 illustrates an implementation of a pseudo-random binary sequence generator providing sufficient randomization to meet the randomization objectives.

In an alternative embodiment, the separation between pulses may include a randomized portion based upon a number received from pseudo-random number generator 56 of FIG. 4. If the off-time is randomized, the flashing will appear to be based upon asynchronous events (like packets) and not based upon a continuously updated state machine. In this embodiment, each activity level (except zero and ON) has a predetermined range of pulse separation lengths associated with it. The separation between pulses in an activity is random within a predetermined range. The separation comprises a minimum width and a variable width that is a function of a random number, which is an integer, generated by the pseudo-random number generator. The description related to FIG. 8 provides additional information concerning generation of the random number.

An algorithm for determining the Turn_off_Timer value, i.e., the separation, is:

$$Turn\_off\_timer=Pulse\_Width*(Min\_Width+Var\_Width)$$

$$Min\_Width=2^{\wedge\wedge}(Max\_Value-Reg\_Value)$$

$$Var\_Width=random(Min\_Width)$$

The Min_Width values are illustrated in FIG. 7, and are computed by raising two to the power of Max_Value−Reg_Value. For level 1, Min_Value=(Max_Value−Reg_Value)=(4−1)=3. Two to the third power equals a Min_Width factor of 8, times a pulse width of 10 milliseconds equals a Min_Width value for level 1 of 80 milliseconds. The Var_Width is also illustrated in FIG. 7. For level 1, random(Min_Width) is a random number between 0 and Min_Width and is different for each port (n). The variable portion of the separation between pulses for level 1 ranges from 0 to 80 milliseconds. The predetermined range for the activity level 1 (Reg_Value=1) Turn_off_timer is 80 to 160 milliseconds. The other Turn_off_timer values are similarly calculated.

The process at block 97 provides a randomized variability in the separation between each pulse of an activity level. The process at block 97 further provides a randomized variability between adjacent flashing LEDs representing a same activity level.

Next, at block 98, the Turn_off_Timer pops ending the separation or "off-time" after the pulse. The process then returns to block 91, and repeats continuously until the network component is turned off. Process 90 is performed for each port of the network component.

FIG. 8 illustrates an implementation of a pseudo-random binary sequence generator providing sufficient randomization to meet randomization objectives. FIG. 8 illustrates a pseudo-random binary sequence 110 generated by a pseudo-random binary sequence generator, such as pseudo-random number generator 56 of FIG. 4, in accordance with an embodiment of the present invention. A random number is required at block 97 of FIG. 6, "set Turn_off_Timer," to provide the variable width portion of the separation between pulses, as is illustrated in FIG. 7. The variation in the separation between pulses in turn provides a randomized variability between each flash of an LED. The variation in the separation further provides a randomized variability between adjacent flashing LEDs representing a same activity level. The objective of the randomization is to diminish any suggestion that the activity among several ports is synchronized or correlated, which might be interpreted by an administrator that a fault condition exists. Randomizing the flashing of an LED also simulates the randomness of regular network activity.

A pseudo-random number is sufficient to meet the above objectives, and a true random number is not required. The randomization may be implemented by using a shift register 110 containing an eight bit, pseudo-random number 112, and by tapping the pseudo-random number 112 at different bit positions for different ports. The bits of the pseudo-random number 112 are shifted in the direction of the arrow 120 on each clock cycle. FIG. 8 illustrates providing a binary number (114) from Bit 5 to block 97 "set Turn_off_Timer" of process 100 of FIG. 6 for one port, and providing a binary number (116) from Bit 7 to "set Turn_off_Timer" for another port. In this example, the two pseudo-random binary values are separated by two clock cycles. If signals are being generated for two ports that are on the same activity level during an interval of time, the spacing of the two ports will be different 50% of the time. In this instance, the port provided with a random bit (114) from bit 5 will have a longer separation between pulses than the random bit (116) being provided from bit 7 because the value "1" will increase the port's separation value. In the next cycle of the clock, the two ports will have an equal delay as bit 5 and bit 7 will both be 0. The exclusive OR gate 118 provides the feedback to create the random stream. It mixes the two outputs and feeds them into the input. This results in

00=0
01=1
10=1
11=0

The number of bits in the pseudo-random binary number may be varied to meet the objectives of randomization, and may be effected by the number of ports in the network component. The random bit or bits may be provided by any other means or method known to those in the art suitable to meet the objectives of the randomization.

While particular embodiments of the present invention have been shown and described, modifications may be made. It is therefore intended in the appended claims to cover all such changes and modifications that fall within the true spirit and scope of the invention.

APPENDIX

Verilog Code File

```
//////////////////////////////////////////////////////////////////////////
//         Copyright (c) 2000 Hewlett-Packard Company. All Rights Reserved.   //
//              The contents of this file are proprietary and confidential to the   //
//              Hewlett-Packard Company. No part of this file may be photocopied,   //
//              reproduced or translated to another program language without the   //
//                     prior written consent of Hewlett-Packard Company.         //
//                                                                              //
//                         RESTRICTED RIGHTS LEGEND                             //
//                                                                              //
//              Use, duplication or disclosure by the Government is subject to   //
//              restrictions as set forth in subdivision (b) (3) (ii) of the Rights   //
//              in Technical Data and Computer Software clause at 52.227-7013.   //
//                                                                              //
//                              Hewlett-Packard Company                         //
//                                 3000 Hanover Street                          //
//                                 Palo Alto, CA 94303                          //
//////////////////////////////////////////////////////////////////////////
//   hot_swap.v
//
//   This PLD provides the following:
//   1. Hot Swap Interrupt
//   2. Led Outputs
//   3. XCVR ID Bits
//   4. Tri State Enables
//   5. Misc Inputs
//////////////////////////////////////////////////////////////////////////
module hot_swap(
    proc_clk,
    act_clk,
    sys_rst_L,
    rcs_L,
      addr,
      data,
    we_L,
    foe_L,
    blink_clk,
    xcvr1_id,
    xcvr2_id,
    xcvr3_id,
    slot_num,
    rxdv,
    cpu_reset_L,
    cpu_reset2_L,
    gewrap,
    pwr_dwn_out,
    tbi_en,
    mode_led_out_L,
    link_led_out_L,
```

APPENDIX-continued

Verilog Code File

```verilog
        xcvr_rst_L,
        xcvr_tri_en_L,
        hot_swap_int_L
        );
input   proc_clk;           // Processor Clock
input   act_clk;            // 10ms period clock for activity led
input   sys_rst_L;          // System Reset
input   rcs_L;              // Input Chip Selects
input   [3:0] addr;         // Address
input   we_L;               // Write Enable
input   foe_L;              // output enable
input   blink_clk;          // Led Blink Clock (1.6s period)
input [3:0] xcvr1_id;
input [3:0] xcvr2_id;
input [3:0] xcvr3_id;
input [2:0] slot_num;
input [2:0] rxdv;
output cpu_reset_L;         // Syncronized Reset
output cpu_reset2_L;
output [2:0] gewrap;
output [2:0] pwr_dwn_out;
output [2:0] tbi_en;
output [2:0] mode_led_out_L;
output [2:0] link_led_out_L;
output hot_swap_int_L;
output [2:0] xcvr_rst_L;
output [2:0] xcvr_tri_en_L;
inout [7:0] data;           // Data
// Local registers
reg [2:0] tbi_en;
reg [3:0] xcvr1_value;
reg [3:0] xcvr2_value;
reg [3:0] xcvr3_value;
reg [2:0] xcvr_rst_L;
reg [2:0] xcvr_tri_en_L;
reg [7:0] data_out;
reg [2:0] mode_led_L;
reg [2:0] link_led_L;
reg activity_en;
reg [2:0] blink_mask;
reg [2:0] auto_blink;
reg [1:0] act_val1;
reg [1:0] act_val2;
reg [1:0] act_val3;
reg [6:0] scrambler;
reg sw_act1;
reg sw_act2;
reg sw_act3;
reg hw_act1;
reg hw_act2;
reg hw_act3;
reg hw_activ1;
reg hw_activ2;
reg hw_activ3;
reg [4:0] sw_count1;
reg [4:0] sw_count2;
reg [4:0] sw_count3;
reg load_count1;
reg load_count2;
reg load_count3;
reg [2:0] gewrap;
reg [2:0] pwr_dwn;
wire [2:0] pwr_dwn_out;
wire [2:0] mode_led_out_L;
wire [2:0] link_led_out_L;
reg sync_rst_1_L;
reg sync_rst_2_L;
reg cpu_reset_L;
reg cpu_reset2_L;
// Board Rev ID
parameter HW_REV = 2'b00;
parameter MODULE_ID = 3'b010;
//Registers
parameter MODULE       = 4'd0;
parameter XCVR1        = 4'd1;
parameter XCVR2        = 4'd2;
parameter XCVR3        = 4'd3;
```

APPENDIX-continued

Verilog Code File

```
parameter LED           = 4'd4;
parameter BLINK_MASK    = 4'd5;
parameter XCVR_EN       = 4'd6;
parameter ACTIVITY      = 4'd7;
parameter TBI_EN        = 4'd8;
parameter LOOPBACK      = 4'd9;
// Sync Processor Reset
always @(posedge proc_clk)
    begin
        sync_rst_1_L <= sys_rst_L;
        sync_rst_2_L <= sync_rst_1_L;
        cpu_reset_L <= sync_rst_2_L;
        cpu_reset2_L <= sync_rst_2_L;
    end
// Tri State For Power Down Signals
assign pwr_dwn_out[2] = !xcvr_tri_en_L[2] ? pwr_dwn[2]: 1'bz;
assign pwr_dwn_out[1] = !xcvr_tri_en_L[1] ? pwr_dwn[1]: 1'bz;
assign pwr_dwn_out[0] = !xcvr_tri_en_L[0] ? pwr_dwn[0]: 1'bz;
// Register Writes
wire xcvr1_val_write = !(!we_L && (addr[3:0] == XCVR1) && !rcs_L);
always @(posedge xcvr1_val_write or
         negedge sys_rst_L)
    begin
        if (!sys_rst_L)   //Async Reset
        begin
            xcvr1_value <= 4'hF;
        end
        else
        begin
            xcvr1_value <= data[3:0];
        end
    end
wire xcvr2_val_write = !(!we_L && (addr[3:0] == XCVR2) && !rcs_L);
always @(posedge xcvr2_val_write or
         negedge sys_rst_L)
    begin
        if (!sys_rst_L)   //Async Reset
        begin
            xcvr2_value <= 4'hF;
        end
        else
        begin
            xcvr2_value <= data[3:0];
        end
    end
wire xcvr3_val_write = !(!we_L && (addr[3:0] == XCVR3) && !rcs_L);
always @(posedge xcvr3_val_write or
         negedge sys_rst_L)
    begin
        if (!sys_rst_L)   //Async Reset
        begin
            xcvr3_value <= 4'hF;
        end
        else
        begin
            xcvr3_value <= data[3:0];
        end
    end
wire led_write = !(!we_L && (addr[3:0] == LED) && !rcs_L);
always @(posedge led_writes or
         negedge sys_rst_L)
    begin
        if (!sys_rst_L)   //Async Reset
        begin
            link_led_L <= 3'd0;
            mode_led_L <= 3'd0;
        end
        else
        begin
            link_led_L <= data[5:3];
            mode_led_L <= data[2:0];
        end
    end
wire blink_mask_write = !(!we_L && (addr[3:0] == BLINK_MASK) && !rcs_L);
always @(posedge blink_mask_write or
         negedge sys_rst_L)
    begin
```

APPENDIX-continued

Verilog Code File

```verilog
        if (!sys_rst_L)   //Async Reset
          begin
             auto_blink[2:0] <= 3'd0;
             blink_mask[2:0] <= 3'd0;
          end
        else
          begin
             auto_blink[2:0] <= data[5:3];
             blink_mask[2:0] <= data[2:0];
          end
     end
wire xcvr_en_write = !(!we_L && (addr[3:0] == XCVR_EN) && !rcs_L);
always @(posedge xcvr_en_write or
           negedge sys_rst_L)
  begin
     if (!sys_rst_L)   //Async Reset
       begin
          xcvr_tri_en_L <= 3'b111;
          xcvr_rst_L <= 3'd0;
       end
     else
       begin
          xcvr_tri_en_L[2] <= !data[5];
          xcvr_tri_en_L[1] <= !data[4];
          xcvr_tri_en_L[0] <= !data[3];
          xcvr_rst_L[2] <= !data[2];
          xcvr_rst_L[1] <= !data[1];
          xcvr_rst_L[0] <= !data[0];
       end
  end
wire activity_write = !(!we_L && (addr[3:0] == ACTIVITY) && !rcs_L);
always @(posedge activity_write or
           negedge sys_rst_L)
  begin
     if (!sys_rst_L)   //Async Reset
       begin
          activity_en <= 1'b0;
          act_val1 <= 2'd0;
          act_val2 <= 2'd0;
          act_val3 <= 2'd0;
       end
     else
       begin
          activity_en <= data[6];
          act_val3 <= data[5:4];
          act_val2 <= data[3:2];
          act_val1 <= data[1:0];
       end
  end
wire tbi_en_write = !(!we_L && (addr[3:0] == TBI_EN) && !rcs_L);
always @(posedge tbi_en_write or
           negedge sys_rst_L)
  begin
     if (!sys_rst_L)   //Async Reset
       begin
          pwr_dwn[2:0] <= 3'b111;
          tbi_en[2:0] <= 3'd0;
       end
     else
       begin
          pwr_dwn[2:0] <= data[5:3];
          tbi_en[2:0] <= data[2:0];
       end
  end
wire loopback_write = !(!we_L && (addr[3:0] == LOOPBACK) && !rcs_L);
always @(posedge loopback_write or
           negedge sys_rst_L)
  begin
     if (!sys_rst_L)   //Async Reset
       begin
          gewrap[2:0] <= 3'd0;
       end
     else
       begin
          gewrap[2:0] <= data[2:0];
       end
  end
```

APPENDIX-continued

Verilog Code File

```
// Put in Tri state
assign data[7:0] = (!foe_L && !rcs_L) ? data_out[7:0] : 8'bzzzzzzzz;
// Register Reads
always @(addr or
         blink_mask
case (addr[3:0])
    MODULE: begin
            data_out[7:5] = slot_num[2:0];
        data_out[4:3] = HW_REV;
        data_out[2:0] = MODULE_ID;
    end
    XCVR1: begin
        data_out[7:4] = xcvr1_id;
        data_out[3:0] = xcvr1_value;
    end
    XCVR2: begin
        data_out[7:4] xcvr2_id;
        data_out[3:0] xcvr2_value;
    end
    XCVR3: begin
        data_out[7:4] xcvr3_id;
        data_out[3:0] xcvr3_value;
    end
    LED: begin
        data_out[7:6] 2'd0;
        data_out[5:3] link_led_L[2:0];
        data_out[2:0] mode_led_L[2:0];
    end
    BLINK_MASK: begin
        data_out[7:6] = 2'd0;
        data_out[5:3] = auto_blink[2:0];
        data_out[2:0] = blink_mask[2:0];
    end
    XCVR_EN: begin
        data_out[7:6] 2'd0;
        data_out[5] = !xcvr_tri_en_L[2];
        data_out[4] = !xcvr_tri_en_L[1];
        data_out[3] = !xcvr_tri_en_L[0];
        data_out[2] = !xcvr_rst_L[2];
        data_out[1] = !xcvr_rst_L[1];
        data_out[0] = !xcvr_rst_L[0];
    end
    ACTIVITY: begin
        data_out[7] = 1'd0;
        data_out[6] = activity_en;
        data_out[5:4] = act_val3[1:0];
        data_out[3:2] = act_val2[1:0];
        data_out[1:0] = act_val1[1:0];
    end
    TBI_EN: begin
        data_out[7:6] = 2'd0;
        data_out[5:3] = pwr_dwn[2:0];
        data_out[2:0] = tbi_en[2:0];
    end
    LOOPBACK: begin
        data_out[7:3] = 5'd0;
        data_out[2:0] = gewrap[2:0];
    end
    default: begin
        data_out[7:0] = 7'd0;
    end
endcase
// Hot Swap Interrupt
wire_xcvr3_not_equal = (xcvr3_id[3:0] != xcvr3_value[3:0]);
wire_xcvr2_not_equal = (xcvr2_id[3:0] != xcvr2_value[3:0]);
wire_xcvr1_not_equal = (xcvr1_id[3:0] != xcvr1_value[3:0]);
wire_hot_swap_int_L = ! (xcvr3_not_equal ||
                         xcvr2_not_equal ||
                         xcvr1_not_equal);
//Link LED Blinking!
assign     link_led_out_L[2] = !((!link_led_L[2] && !blink_mask[2]) ||
                                 (blink_clk && blink_mask[2]));
assign     link_led_out_L[1] = !((!link_led_L[1] && !blink_mask[1]) ||
                                 (blink_clk && blink_mask[1]));
assign     link_led_out_L[0] = !((!link_led_L[0] && !blink_mask[0]) ||
                                 (blink_clk && blink_mask[0]));
// Activity and Mode
```

APPENDIX-continued

Verilog Code File

```verilog
assign   mode_led_out_L[2] = !((!mode_led_L[2] && !activity_en) ||
                               (hw_act3 && activity_en && auto_blink[2]) ||
                               (sw_act3 && activity_en && !auto_blink[2]));
assign   mode_led_out_L[1] = !((!mode_led_L[1] && !activity_en) ||
                               (hw_act2 && activity_en && auto_blink[1]) ||
                               (sw_act2 && activity_en && !auto_blink[1]));
assign   mode_led_out_L[0] = !((!mode_led_L[0] && !activity_en) ||
                               (hw_act1 && activity_en && auto_blink[0]) ||
                               (sw_act1 && activity_en && !auto_blink[0]));
//HW/SW Activity Mode
// Scrambler
always @(posedge act_clk or negedge sys_rst_L)
begin
   if (!sys_rst_L)
      begin
         scrambler[6:0] <= 7'b1111111;
      end
   else
      begin
         scrambler[6:0] <= {(scrambler[1] ^ scrambler [0]),scrambler[6:1]};
      end
end
//SW activity signal
always @(posedge act_clk or negedge sys_rst_L)
begin
   if (!sys_rst_L)
      begin
         sw_act1 <= 1'd0;
      end
   else
      begin
         if ((sw_count1 == 5'd0) && (act_val1 != 2'b00))
            begin
               if (act_val1 != 2'b11)
                  sw_act1 <= 1'b1;
               else
                  sw_act1 <= !sw_act1;
            end
         else
            begin
               if (act_val1 != 2'b11)
                  sw_act1 <= 1'b0;
            end
      end
end
// Activity Counter
always @(posedge act_clk)
begin
   if (load_count1 || (sw_count1 == 5'd0))
      case (act_val1)
         2'b00: begin
            sw_count1 <= 5'd0;
         end
         2'b01: begin
            sw_count1 <= {1'b1,scrambler[1:0],2'b00};
         end
         2'b10: begin
            sw_count1 <= {3'b0,!scrambler[2],scrambler[2:0]};
         end
         3'b11: begin
            sw_count1 <= {5'b00110};
         end
      endcase
   else
      sw_count1 <= (sw_count1 - 1'b1);
end
//
// Counter Loader
always @(posedge act_clk or negedge activity_write)
begin
   if (!activity_write)
      load_count1 <= 1'b1;
   else
      load_count1 <= 1'b0;
end
//SW Activity Signal
always @(posedge act_clk or negedge sys_rst_L)
```

APPENDIX-continued

Verilog Code File

```
begin
  if (!sys_rst_L)
    begin
      sw_act2 <= 1'd0;
    end
  else
    begin
      if ((sw_count2 == 5'd0) && (act_val2 != 2'b00))
        begin
          if (act_val2 != 2'b11)
            sw_act2 <= 1'b1;
          else
            sw_act2 <= !sw_act2;
        end
      else
        begin
          if (act_val2 != 2'b11)
            sw_act2 <= 1'b0;
        end
    end
end
// Activity Counter
always @(posedge act_clk)
begin
  if (load_count2 || (sw_count2 == 5'd0))
    case (act_val2)
      2'b00: begin
        sw_count2 <= 5'd0;
      end
      2'b01: begin
        sw_count2 <= {1'b1,scrambler[4:3],2'b00};
      end
      2'b10: begin
        sw_count2 <= {3'b0,:scrambler[5],scrambler[5:3]};
      end
      3'b11: begin
        sw_count2 <= {5'b00110};
      end
    endcase
  else
    sw_count2 <= (sw_count2 - 1'b1);
end
// Counter Loader
always @(posedge act_clk or negedge activity_write)
begin
  if (!activity_write)
    load_count2 <= 1'b1;
  else
    load_count2 <= 1'b0;
end
//SW Activity
always @(posedge act_clk or negedge sys_rst_L)
begin
  if (!sys_rst_L)
    begin
      sw_act3 <= 1'd0;
    end
  else
    begin
      if ((sw_count3 == 5'd0) && (act_val3 != 2'b00))
        begin
          if (act_val3 !=2'b11)
            sw_act3 <= 1'b1;
          else
            sw_act3 <= !sw_act3;
        end
      else
        begin
          if (act_val3 != 2'b11)
            sw_act3 <= 1'b0;
        end
    end
end
// Activity Counter
always @(posedge act_clk)
begin
  if (load_count3 || (sw_count3 == 5'd0))
```

APPENDIX-continued

Verilog Code File

```
    case (act_val3)
      2'b00: begin
        sw_count3 <= 5'd0;
      end
      2'b01: begin
        sw_count3 <= {1'b1,scrambler[5:4],2'b00};
      end
      2'b10: begin
        sw_count3 <= {3'b0,!scrambler[6],scrambler[6:4]};
      end
      3'b11: begin
        sw_count3 <= {5'b00110};
      end
    endcase
  else
    sw_count3 <= (sw_count3 - 1'b1);
end
// Counter Loader
always @(posedge act_clk or negedge activity_write)
begin
  if (!activity_write)
    load_count3 <= 1'b1;
  else
    load_count3 <= 1'b0;
end
// Hardware Activity Stretching
wire hw_activity1 = rxdv[0];
always @(posedge act_clk or posedge hw_activity1)
begin
  if (hw_activity1)
    hw_activ1 <= 1'b1;
  else
    hw_activ1 <= 1'b0;
end
always @(posedge act_clk)
begin
  hw_act1 <= hw_activ1;
end
wire hw_activity2 = rxdv[1];
always @(posedge act_clk or posedge hw_activity2)
begin
  if (hw_activity2)
    hw_activ2 <= 1'b1;
  else
    hw_activ2 <= 1'b0;
end
always @(posedge act_clk)
begin
  hw_act2 <= hw_activ2;
end
wire hw_activity3 = rxdv[2];
always @(posedge act_clk or posedge hw_activity3)
begin
  if (hw_activity3)
    hw_activ3 <= 1'b1;
  else
    hw_activ3 <= 1'b0;
end
always @(posedge act_clk)
begin
  hw_act3 <= hw_activ3;
end
endmodule
```

What is claimed is:

1. An activity-level indicator comprising:
a controller disposed in a network component and operable to receive an activity level of a port from a processor disposed in the network component and associated with the port and to generate a signal that is related to the activity level; and
an indicator device coupled to the controller and operable to indicate the activity level in response to the signal.

2. The activity-level indicator of claim 1, wherein there is a finite number of activity levels.

3. The activity-level indicator of claim 1, wherein the indicator device indicates activity by flashes.

4. The activity-level indicator of claim 1, wherein the indicator device is a light emitting diode.

5. An activity-level indicator comprising:
a controller operable to receive an activity level of a port from a processor associated with the port and to generate a signal that is related to the activity level, the signal comprising a series of separated pulses, the separation between pulses being a non-linear function of the activity level; and an indicator device coupled to the controller and operable to indicate the activity level in response to the signal.

6. The activity-level indicator of claim 5, wherein there is a finite number of activity levels.

7. The activity-level indicator of claim 5, wherein the indicator device indicates activity by flashes.

8. The activity-level indicator of claim 5, wherein the indicator device is a light emitting diode.

9. An activity-level indicator comprising:
a controller operable to receive an activity level of a port from a processor associated with the port, and to generate a signal that is related to the activity level, the signal comprising a series of separated pulses, the length of a separation being randomized within a predetermined range for that activity level; and
an indicator device coupled to the controller and operable to indicate the activity level in response to the signal.

10. The activity-level indicator of claim 9, wherein the controller is further operable to generate a randomized number, and the separation is a function of the activity level and the randomized number generated for that separation.

11. The activity-level indicator of claim 9, wherein there is a finite number of activity levels.

12. The activity-level indicator of claim 9, wherein the indicator device indicates activity by flashes.

13. The activity-level indicator of claim 9, wherein the indicator device is a light emitting diode.

14. A system for indicating the activity level of a port, comprising:
a processor operable to receive port activity information and determine a port activity level;
a controller operable to receive the port activity level, and to generate a signal that is related to the activity level; and
an indicator device coupled to the controller and operable to indicate the activity level in response to the signal.

15. A system for indicating the activity level of a port, comprising:
a processor operable to receive port activity information, and determine a port activity level;
a controller operable to receive the port activity level and to generate a signal that is related to the activity level, the signal comprising a series of separated pulses, the separation between pulses being a non-linear function of the activity level; and
an indicator device coupled to the controller and operable to indicate the activity level in response to the signal.

16. A system for indicating the activity level of a port to a user, comprising:
a processor operable to receive port activity information, and determine a port activity level;
a controller operable to receive an activity level of a port, to generate a randomized number, and to generate a signal that is related to the activity level, the signal comprising a series of separated pulses, the length of a separation being randomized within a predetermined range for that activity level; and
an indicator device coupled to the controller and operable to indicate the activity level in response to the signal.

17. A method of representing the activity level of a port, comprising the steps of:
receiving port activity information with a processor disposed in a network component;
determining a port activity level with the processor;
generating a signal related to the port activity level with a controller that is separate from the processor and disposed in the network component; and
indicating the activity level with an indicator device coupled to the controller and driven by the signal.

18. The method of claim 17, wherein the same processor receives the port activity information and determines the port activity level.

19. The method of claim 17, further comprising determining the port activity level as a non-linear function of the port activity.

20. A method of representing the activity level of a port, comprising the steps of:
receiving port activity information with a processor;
determining a port activity level with a processor;
generating a signal related to the port activity level with a controller that is separate from the processor, the signal comprising a series of separated pulses, the separation between pulses being a non-linear function of the activity level; and
indicating the activity level with an indicator device coupled to the controller and driven by the signal.

21. The method of claim 20, wherein the same processor receives the port activity information and determines the port activity level.

22. A method of representing the activity level of a port, comprising the steps of:
receiving port activity information with a processor;
determining a port activity level with a processor;
generating a signal related to the port activity level with a controller that is separate from the processor, the signal comprising a series of separated pulses, the length of a separation being randomized within a predetermined range for that activity level; and
indicating the activity level with an indicator device coupled to the controller and driven by the signal.

23. The method of claim 22, wherein the same processor receives the port activity information and determines the port activity level.

24. An activity-level indicator comprising:
means disposed in a network component for receiving an activity level of a port from a processor disposed in the network component and associated with the port and generating a signal that is related to the activity level; and
means for indicating the activity level in response to the signal.

* * * * *